United States Patent Office 3,138,280
Patented June 23, 1964

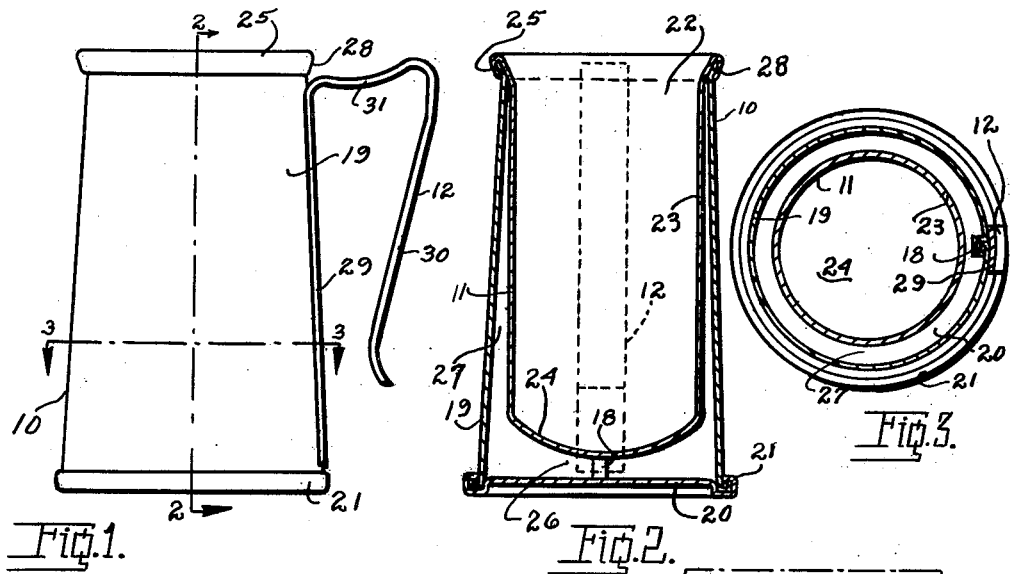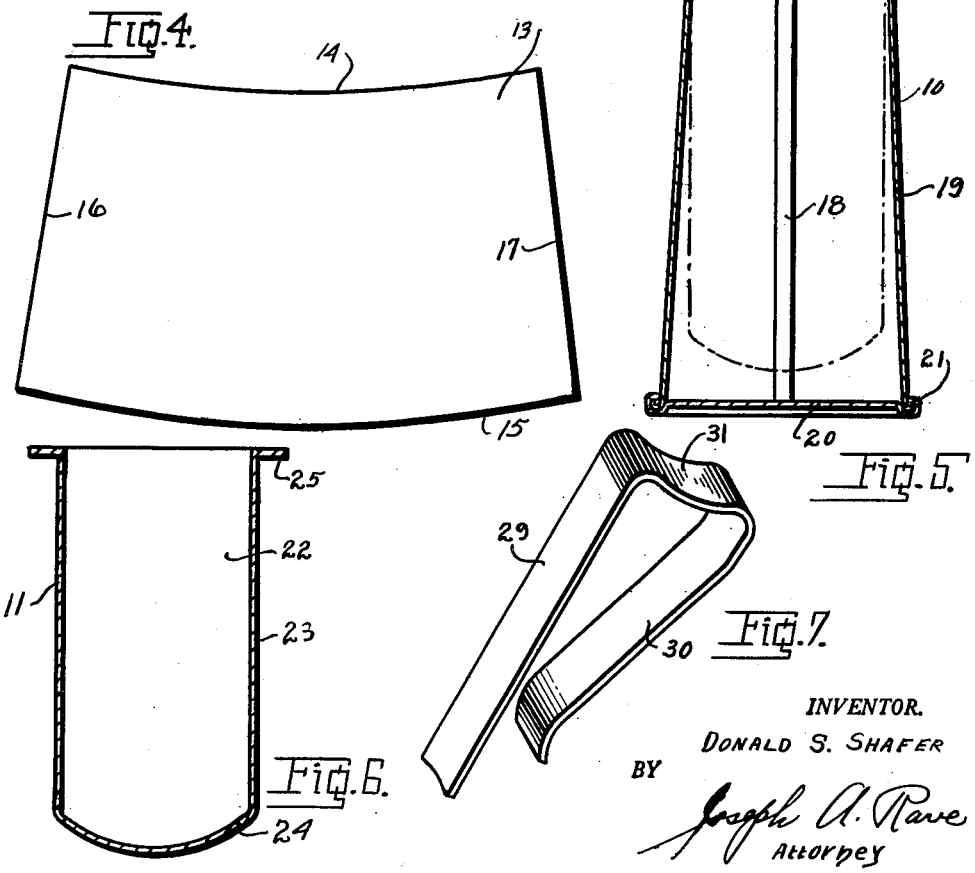

3,138,280
INSULATED CONTAINERS
Donald S. Shafer, Cincinnati, Ohio, assignor to Watkins Manufacturing Company, Cincinnati, Ohio, a corporation of Ohio
Filed Jan. 11, 1961, Ser. No. 82,040
6 Claims. (Cl. 220—10)

This invention relates to improvements in insulated containers, that is, containers such as cups, tumblers, bowls and the like, formed from metal, preferably, stainless steel.

The insulation of the container is effected by providing a dead air space between an outer member and an inner member suspended and secured within the outer member.

Broadly, insulated containers are not new in the present application but previous containers were manufactured through a complicated process while the container of the present invention is readily produced by a simplified process such as is well known.

It is, therefore, the principal object of the present invention to provide an insulated metallic container that may be economically produced and as produced is rigid and substantially indestructible.

Another object of the present invention is the provision of a metallic insulated container in which the components are produced in a well known manner and which components are permanently connected to one another by a simple connecting operation.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 1 is a side elevational view of a container embodying the principles of the present invention.

FIG. 2 is a vertical, sectional view through the container of FIG. 1 as seen on line 2—2 on said FIG. 1.

FIG. 3 is a horizontal, sectional view through the container of FIG. 1 as seen from line 3—3 on said FIG. 1.

FIG. 4 is a plan view of a blank from which the body portion of the outer member of the insulated container of FIG. 1 is formed.

FIG. 5 is a vertical, sectional view through the outer member of the container of FIG. 1 prior to the connection therewith of the inner container.

FIG. 6 is a vertical, sectional view of the inner member of the insulated container of FIG. 1 prior to its association and connection with the outer container.

FIG. 7 is a perspective view of a handle member attachable to the insulated container.

Throughout the several views of the drawings similar reference characters are employed to denote the same or similar parts.

As was noted above this invention relates to insulated containers such as cups, tumblers, bowls, shallow dishes, and the like, particularly when formed of metal such as stainless steel and other non-corrosive metals in sheet form.

In general, and referring particularly to FIG. 2, the insulated container comprises an outer member 10 and an inner member 11 secured to one another in telescoped relation and to which outer member may be applied a handle 12. As shown in the drawings the outer member 10 is formed of a body member 13, illustrated in plan in FIG. 4, having a concaved upper edge 14, a convexed bottom edge 15 and inwardly upwardly tapering side edges 16 and 17. The said body member 13 is bent and formed to be substantially circular in cross-section and with its side edges 16 and 17 upset and interlocked to form a metal seam as at 18 in FIG. 3.

The outer container after being formed to have its vertical edges 16 and 17 seamed to one another provides in effect a truncated cone with its bottom 15 of a greater diameter than its top 14 wherefore the wall 19 of the outer container 10 inclines inwardly from the bottom to the top thereof.

The bottom 15 of the outer container is closed by a bottom closure member 20 secured to the periphery of the bottom by the usual metal seam 21, see FIGS. 2 and 5. The top of the truncated cone, similar to the bottom thereof, including the closure 18, is horizontal and, wherefore, said top and bottom are parallel with one another.

The inner container 11 is a seamless drawn member including a body portion 22 with its wall 23 substantially parallel for the height of its axis and having an integral bottom 24 preferably of a concavo-convexo configuration. The upper end of the body portion 22 is provided with a peripheral radial flange 25 outwardly radially of the wall 23.

The diameter of the body portion 22 is equal, substantially, to the inner diameter of open upper end or top 14 of the outer member 10 after the same has been formed from the blank 13 and as illustrated in FIG. 5. The inner member 11 is telescoped within the outer member until its flange 25 rests on the upper free edge 14 of the said outer member 10. It is therefore obvious that the said inner member 11 is of less height than the outer member 10 and, in fact, is formed to provide a space 26, see FIG. 2, between the inner member bottom 24 and the outer member closure member 20.

The inner member body 22 has its wall 23 as noted above parallel with the axis longitudinally thereof, wherefore upon the telescoping of said inner member with the outer member there is provided a space 27 between the outer surface of the inner member wall 23 and the inner surface of the outer member wall 19, said space 27 increasing in width from the top of the container downwardly thereof.

After the inner member has been telescoped within the outer member, said telescoping of the said members being illustrated in FIG. 5 with said inner member being depicted in phantom lines, the flange 25 of the inner member is downwardly bent to engage the upper end of the outer member. The said downwardly bent flange, the engaged portion of the upper end of the outer member, and an equal portion of the upper end of the inner member body wall 23 are then pressed into engagement with one another and the same outwardly flared as at 28 in FIG. 2. Said outwardly flared portion 28 of the container, engaged flange and embraced portion of the inner and outer members, thereby provide a flared lip or reinforced upper edge to the container. This connection of the parts gives to the container a pleasing look as well as a sense of rigidity when the container is used for drinking purposes. It will be obvious from FIG. 2 that this construction is substantially non-destructible as the inner and outer container are permanently prevented from relative movement either axially or rotatively of one another, since the parts are permanently pressed into engagement; if desired however, the flange 25 and outer container may be brazed, welded, or otherwise secured to one another.

By the construction thus far set forth and if the inner and outer members are formed to dimensions generally acceptable for tumblers, an acceptable insulated tumbler of stainless steel, for example, has been provided. If said inner and outer members are formed to diameters or dimensions considerably in excess to their heights, such as are normally accepted for bowls, serving dishes, infant's feeding plates, and the like, then there has been provided an acceptable metallic "dish" for the purposes set forth.

If now the tumbler, relatively small diameter by comparison to its height, form of the container were used and a handle attached thereto, a drinking cup or mug would result, and such a specific item is illustrated in the drawings.

As shown in FIGS. 1 and 7 the handle 12, specifically, comprises an attaching or securing portion 29, a grip or handle, per se, portion 30 and a top or connecting portion 31. For convenience and for the sake of appearance, the handle body securing, or attaching portion 29 is formed of a size to extend between the outer container bottom seam 21 and the lower edge of the down turned top flange or lip 28. The said handle body portion 29 is secured to the outer container in any suitable or acceptable manner such as by brazing or welding or, if desired, even by rivets (not shown). Preferably in applying the said handle body portion 29 to the container, it is applied over the seam 18 and thereby obscures or hides said seam. Obviously, the said handle body portion 29 may be applied to any other zone or area of the outer member 10, and, obviously, any other form of handle, with or without a full length body portion 29, may also be employed.

From the foregoing, it is believed now obvious that there has been provided an insulated container that is formed of a substantially indestructible construction and otherwise accomplishes the objects initially set forth.

What is claimed is:

1. An insulated container comprising an imperforate outer member cylindrical in cross-section and having an open upper end, a closed bottom end, and a wall extending upwardly from said bottom end to said open upper end and with said closed bottom end of greater diameter than the open upper end wherefore said outer member wall inwardly and upwardly inclines, a pre-formed inner member cylindrical in transverse cross-section and having an open upper end and a closed bottom end and of less height than the height of the outer member between its open upper end and closed bottom end, said inner member being of a diameter throughout its length substantially equal to the inner diameter of the open upper end of the outer member and said inner member being telescoped and suspended within the outer member so that an insulating air space gradually increasing in width from the top to the bottom of the container is provided, a radial flange of a given width at the open upper end of one of said inner and outer members downwardly folded and pressed into engagement with the upper end of the remaining said inner and outer member permanently securing said inner and outer members to one another with their open upper ends in the same plane and providing a sealed air insulating jacket around the inner member and within the outer member, and said downwardly folded flange lying in face contact with the upper end of the other member to provide a three ply lip portion with said portion being outwardly and upwardly flared with respect to the inner member.

2. An insulated container comprising an imperforate outer member cylindrical in cross-section and having an open upper end, a closed bottom end, and a wall extending upwardly from said bottom end to said open upper end and with said closed bottom end of greater diameter than the open upper end wherefore said outer member wall inwardly and upwardly inclines, a pre-formed inner member cylindrical in transverse cross-section and having an open upper end and a closed bottom end and of less height than the height of the outer member between its open upper end and closed bottom end, said inner member being of a diameter throughout its length substantially equal to the inner diameter of the open upper end of the outer member and said inner member being telescoped and suspended within the outer member so that an insulating air space gradually increasing in width from the top to the bottom of the container is provided, said inner member having an outward radial flange of a given width engageable with the open upper end of the outer member for suspending said inner member within the outer member, said flange being folded downwardly of said outer member for impingement on the upper end of said outer member and securing said inner and outer members to one another and forming a sealed air insulating jacket around the inner member and within the outer member, and said down turned flange lying in face contact with the upper end of the outer member to provide a three ply lip portion with said portion being flared upwardly and outwardly to provide an upwardly and outwardly flaring rim at the upper end of the container.

3. An insulated container comprising an imperforate outer member cylindrical in cross-section and having an open upper end, a closed bottom end, and a wall extending upwardly from said bottom end to said open upper end and with said closed bottom end of greater diameter than the open upper end wherefore said outer member wall inwardly and upwardly inclines, a pre-formed inner member cylindrical in transverse cross-section and having an open upper end and a closed bottom end and of less height than the height of the outer member between its open upper end and closed bottom end, said inner member being of a diameter throughout its length substantially equal to the inner diameter of the open upper end of the outer member and said inner member being telescoped and suspended within the outer member so that an insulating air space gradually increasing in width from the top to the bottom of the container is provided, said inner member having an outward radial flange of a given width engageable with the open upper end of the outer member for suspending said inner member within the outer member, said flange being folded downwardly of said outer member for impingement on the upper end of said outer member and securing said inner and outer members to one another and forming a sealed air insulating jacket around the inner member and within the outer member, said down turned flange lying in face contact with the upper end of the outer member to provide a three ply lip portion with said portion being flared upwardly and outwardly to provide an upwardly and outwardly flaring rim at the upper end of the container, and a handle secured to said outer member vertically thereof and including a grip portion outwardly of the container.

4. An insulated container comprising an outer member formed of a blank having a concaved upper end, a convexed lower end and upwardly inwardly tapered side edges from the lower edge connecting same to its upper edge, said blank having its upwardly and inwardly tapered side edges secured to one another to provide a cylinder of a truncated cone formation with its top and bottom open and with said bottom of a greater diameter than the top, a bottom closure member secured to the truncated cone cylindrical bottom, an inner member drawn from a solid blank and of substantially uniform diameter throughout its length and having an open upper end with an outward radial flange of a given width and a closed bottom, said inner member being of less height than the outer member between its open upper end and bottom closure member and of a diameter substantially equal to the internal diameter of the outer member open upper end and with said inner member telescoped within the outer member in operative position by the engagement of the inner member radial flange with the outer member upper end and whereby a gradually increasing insulated air space is provided between the inner and outer members and an insulating air space is provided between the inner member bottom and outer member bottom closing member, and said inner member flange for its full width radially outwardly projecting from the outer member open upper end and downwardly bent into engagement with the outer member downwardly of its open upper end to secure the parts in telescoping positions and providing a sealed air insulating jacket between the inner and outer members around the said inner member, said downwardly bent flange lying in face contact with the upper end of the outer member to provide a three ply lip portion.

5. An insulated container comprising an outer member formed of a blank having a concaved upper end, a convexed lower end and upwardly inwardly tapered side edges from the lower edge connecting same to its upper edge, said blank having its upwardly and inwardly tapered side edges secured to one another to provide a cylinder of a truncated cone formation with its top and bottom open and with said bottom of a greater diameter than the top, a bottom closure member secured to the truncated cone cylindrical bottom, an inner member drawn from a solid blank and of substantially uniform diameter throughout its length and having an open upper end with an outward radial flange of a given width and a closed bottom, said inner member being of less height than the outer member between its open upper end and bottom closure member and of a diameter substantially equal to the internal diameter of the outer member open upper end and with said inner member telescoped within the outer member in operative position by the engagement of the inner member radial flange with the outer member upper end and whereby a gradually increasing insulating air space is provided between the inner and outer members and an insulating air space is provided between the inner member bottom and outer member bottom closing member, said inner member flange for its full width radially outwardly projecting from the outer member open upper end and downwardly bent into engagement with the outer member downwardly of its open upper end to secure the parts in telescoping positions and providing a sealed air insulating jacket between the inner and outer members around the said inner member, and said downwardly bent flange lying in face contact with the upper end of the outer member to provide a three ply lip portion with said portion being upwardly and outwardly flared for permanently securing the parts to one another and providing an upwardly and outwardly flaring rim for the container.

6. An insulated container comprising an outer member formed of a blank having a concaved upper end, a convexed lower end and upwardly, inwardly tapered side edges from the lower edge connecting same to its upper edge, said blank having its upwardly and inwardly tapered side edges secured to one another to provide a cylinder of a truncated cone formation with its top and bottom open and with said bottom of a greater diameter than the top, a bottom closure member secured to the truncated cone cylindrical bottom, an inner member drawn from a solid blank and of substantially uniform diameter throughout its length and having an open upper end with an outward radial flange of a given width and a closed bottom, said inner member being of less height than the outer member between its open upper end and bottom closure member and of a diameter substantially equal to the internal diameter of the outer member open upper end and with said inner member telescoped within the outer member in operative position by the engagement of the inner member radial flange with the outer member upper end and whereby a gradually increasing insulating air space is provided between the inner and outer members and an insulating air space is provided between the inner member bottom and outer member bottom closing member, said inner member flange for its full width radially outwardly projecting from the outer member open upper end and downwardly bent into engagement with the outer member downwardly of its open upper end to secure the parts in telescoping positions and providing a sealed air insulating jacket between the inner and outer members around the said inner member, said downwardly bent flange lying in face contact with the upper end of the outer member to provide a three ply lip portion with said portion being upwardly and outwardly flared for permanently securing the parts to one another and providing an upwardly and outwardly flaring rim for the container, and a handle including an attaching portion secured to said outer member vertically thereof and a grip portion outwardly spaced from the attaching portion.

References Cited in the file of this patent

UNITED STATES PATENTS

| | | |
|---|---|---|
| 353,202 | Butler | Nov. 23, 1886 |
| 1,165,952 | Dunlap | Dec. 28, 1915 |
| 1,384,725 | Levy | July 12, 1921 |
| 2,044,081 | Kjellstrom | June 16, 1936 |
| 2,637,182 | Davis | May 5, 1953 |
| 2,714,296 | Scavullo | Aug. 2, 1955 |
| 2,788,149 | Brown | Apr. 9, 1957 |
| 2,855,120 | Bramming | Oct. 7, 1958 |
| 2,987,212 | Scanlon | June 6, 1961 |